United States Patent [19]

Seitz et al.

[11] 4,437,503
[45] * Mar. 20, 1984

[54] TREAD CONFIGURATION FOR PNEUMATIC VEHICLE TIRES

[75] Inventors: Hans Seitz, Langenhagen; Heinz-Dieter Rach, Garbsen; Henner Pieper; Udo Frerichs, both of Langenhagen, all of Fed. Rep. of Germany

[73] Assignee: Continental Gummi-Werke Aktiengesellschaft, Hanover, Fed. Rep. of Germany

[*] Notice: The portion of the term of this patent subsequent to Jan. 10, 2001 has been disclaimed.

[21] Appl. No.: 419,414

[22] Filed: Sep. 17, 1982

[30] Foreign Application Priority Data

Oct. 2, 1981 [DE] Fed. Rep. of Germany ....... 3139256

[51] Int. Cl.³ ...................... B60C 11/06; B60C 11/08
[52] U.S. Cl. ................................ 152/209 R; D12/140
[58] Field of Search ........... 152/209 R, 209 A, 209 B, 152/209 WT, 209 NT, 209 D, 152, 352 A; D12/136, 138, 139, 140, 141, 150

[56] References Cited

U.S. PATENT DOCUMENTS

| D. 45,723 | 5/1914 | Nichols et al. | D12/139 |
|---|---|---|---|
| D. 57,122 | 2/1921 | Githens | D12/139 |
| D. 57,259 | 3/1921 | Petersen | D12/140 |
| D. 92,281 | 5/1934 | Anderson | D12/140 |
| D. 104,499 | 5/1937 | Mooradran | D12/140 |
| D. 267,246 | 12/1982 | Hammond | D12/140 |
| 2,006,197 | 6/1935 | Ewart et al. | 152/209 R |
| 2,255,994 | 9/1941 | Bush | 152/209 R |
| 2,621,698 | 12/1952 | Zohrer | 152/209 R |
| 3,004,578 | 10/1961 | Braudorn | 152/209 R |
| 3,861,436 | 1/1975 | Pogue | 152/209 R |
| 3,926,238 | 12/1975 | Vorih | 152/209 R |
| 3,951,191 | 4/1976 | Suzuki et al. | 152/209 R |
| 4,337,813 | 7/1982 | Rach et al. | 152/209 R |

Primary Examiner—Edward C. Kimlin
Assistant Examiner—F. K. Wine
Attorney, Agent, or Firm—Becker & Becker, Inc.

[57] ABSTRACT

A tread configuration for pneumatic vehicle tires, especially for spare tires. A number of recesses are arranged in succession and next to each other in the circumferential direction of the tire. Transverse ribs and substantially circumferential ribs separate the recesses from one another and have a width which is approximately ¼ to ¾ of the circumferential dimension of the recesses. The radially outwardly located peripheral surface of the tire is subdivided into several segments. Within each of the segments, the circumferential dimension of the recesses and of the transverse ribs is constant, and the circumferential dimension of the recesses and of the transverse ribs is different in successive segments. The recesses are of such a cross-sectional shape or outline that at least one boundary line thereof is formed by an edge of a transverse rib. At least some of the circumferential ribs extend at an angle to the circumferential direction of the tire.

8 Claims, 5 Drawing Figures

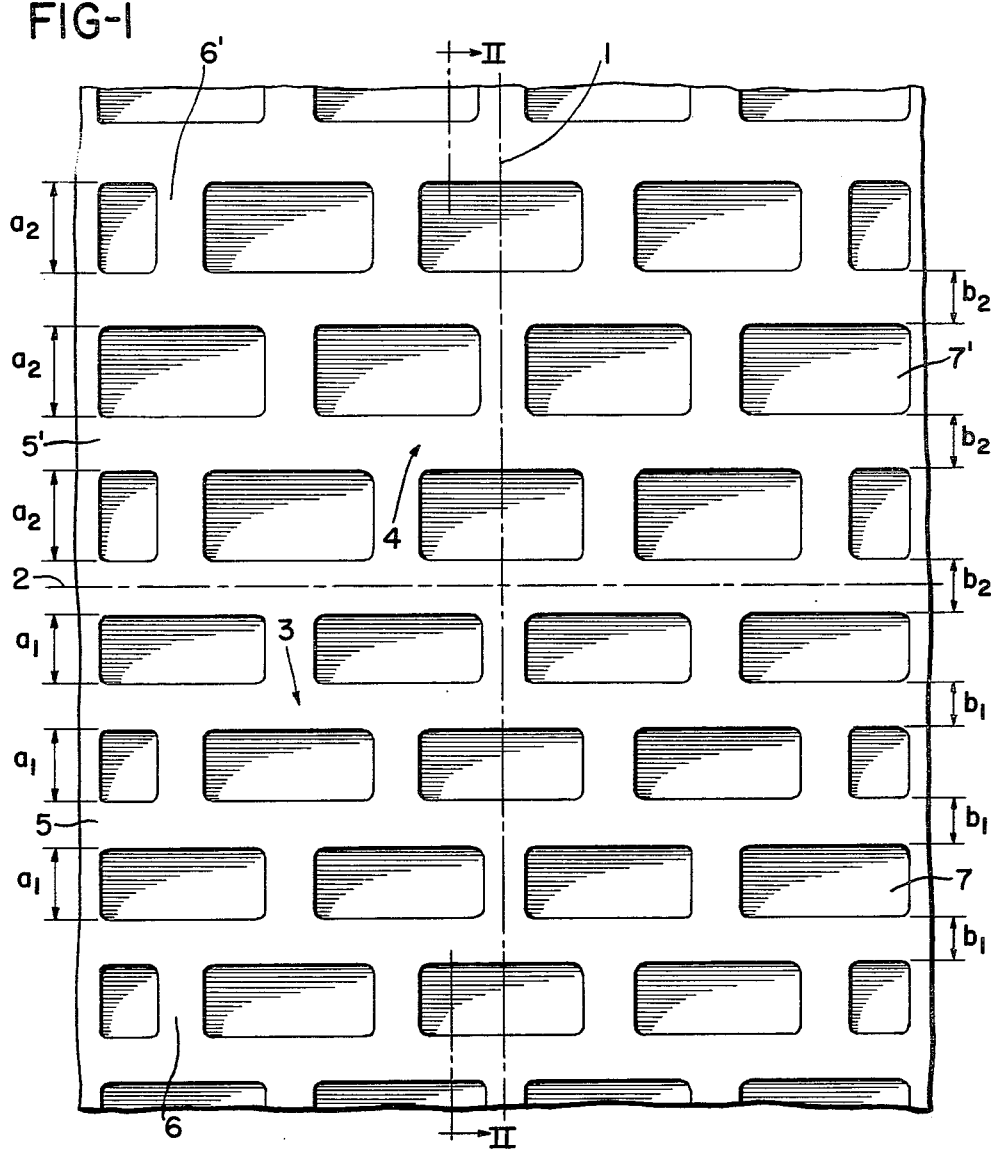
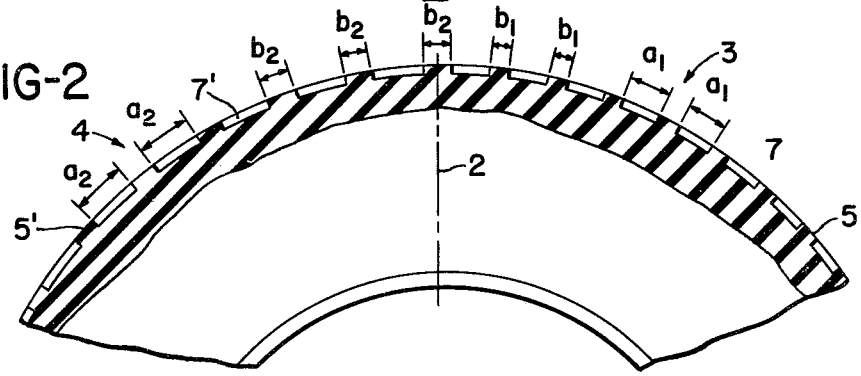

TREAD CONFIGURATION FOR PNEUMATIC VEHICLE TIRES

The present invention relates to a tread configuration for pneumatic vehicle tires, especially for spare tires; a large number of depressions or recesses are arranged next to each other and one after the other when viewed in the circumferential direction of the tire. These recesses have previously been proposed to have a substantially rectangular outline, and extend transverse to the circumferential direction of the tire. Transverse ribs and circumferential ribs separate the recesses from one another and have a width which is approximately ¼ to ⅔ of the circumferential dimension of the adjacent recesses. According to German Patent Application No. P 31 37 334.8, for which a corresponding U.S. patent application Ser. No. 419,413, Seitz et al is filed concurrently herewith, the radially outwardly located peripheral surface of the tire is subdivided into several segments; within each segment, the circumferential dimension of the recesses and of the transverse ribs is constant; and in successive segments, the circumferential dimension of the recesses and of the transverse ribs is different.

Similar tread configurations have been selected for spare tires for passenger vehicles in order to attain noisy rolling of the tire along a street or roadway, and in order to reduce the weight of the spare tires.

With the aforementioned tread configuration, dependence is exclusively made on recesses having approximately rectangular or square cross sections.

It is therefore an object of the present invention to provide a tread configuration according to which recesses having other outlines or cross-sections can also be used while retaining the advantages of the aforementioned tread configuration.

This object, and other objects and advantages of the present invention, will appear more clearly from the following specification in connection with the accompanying drawings, in which:

FIG. 1 shows a fragmentary schematic plan view of an outer peripheral surface of a spare tire for street or road vehicles according to the aforementioned U.S. patent application Ser. No. 419,413, Seitz et al filed concurrently herewith.

FIG. 2 is a fragmentary cross sectional view of the tire taken in a plane at right angles to the axial direction and along line II—II in FIG. 1;

Figure 3:
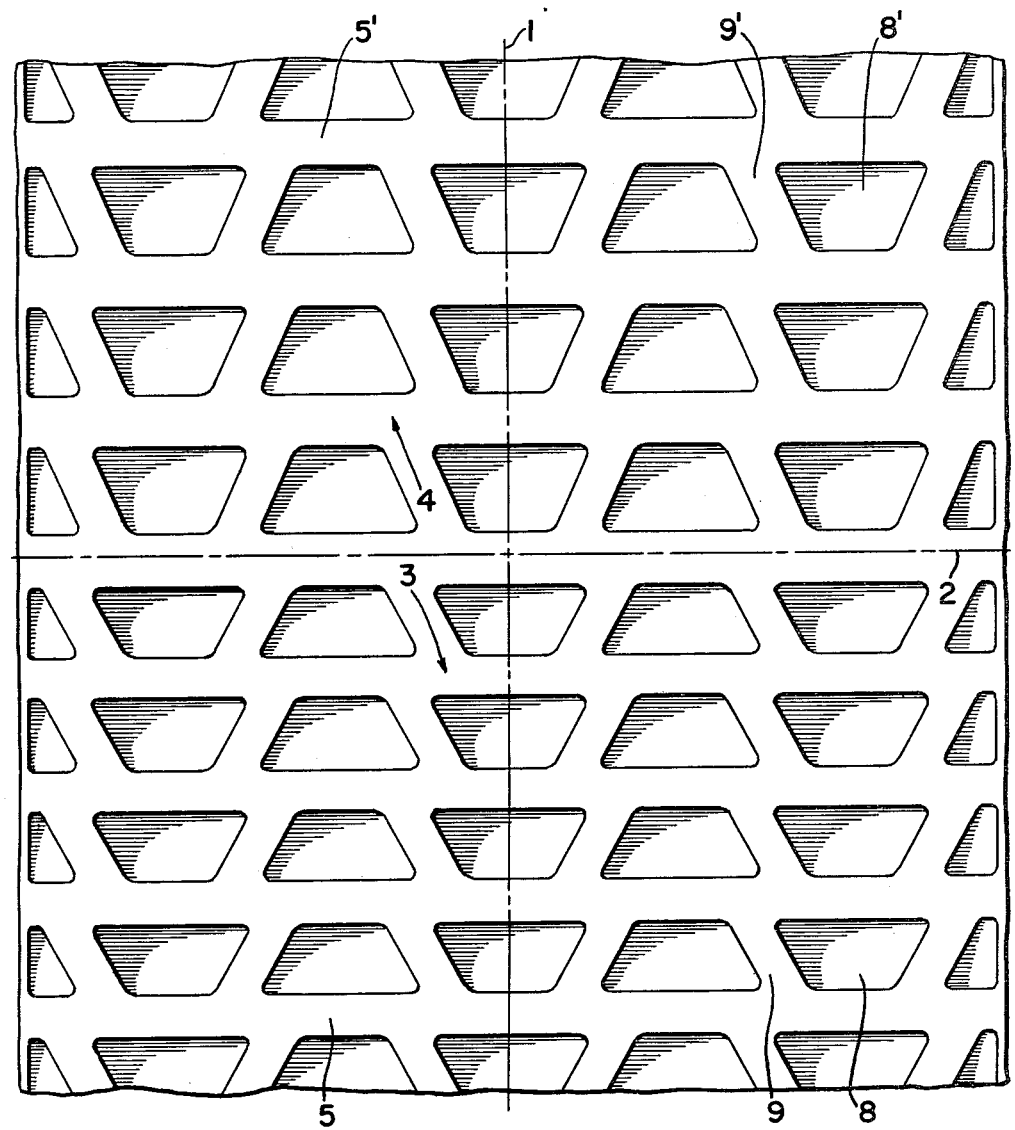
FIG. 3 is a fragmentary plan view of an outer peripheral surface of one embodiment of the inventive tread configuration for a spare tire, with trapezoidal-shaped recesses.

The tread configuration of the present invention is characterized primarily in that the recesses, instead of having an approximately rectangular outline or cross section, have a configuration whereby at least one boundary line thereof is formed by an edge of a transverse rib; and in that the circumferential ribs are replaced at least partially by slanted or inclined ribs.

The present invention proceeds on the basis that to obtain a high noise delivery, and especially to obtain a number of tones which very penetratingly affect the ear of the driver, certain elements of a tread configuration need to cooperate or interact in a definite manner with other elements. Thus, the transverse ribs which are separated from each other by adjacent recesses are presently indispensible.

Furthermore, the circumferential dimension of the transverse ribs and the adjacent recesses must be coordinated with one another.

Finally, the circumferential dimensions of the transverse ribs and recesses of different peripheral segments of the tire must have a predetermined ratio to one another which differs from 1:1.

These requirements can be obtained not only with recesses which have a rectangular or substantially rectangular outline or cross section, but also with recesses having other outlines or cross sections.

The possible shapes of the recesses have in common that at least one of their boundary lines is formed by the edge of a transverse rib. Preferred recesses are those with trapezoidal- or parallelogram-shaped outlines or cross sections.

According to specific embodiments of the present invention, two boundary lines of a given recess may be formed by edges of the transverse ribs. This would be the case for recesses having a trapezoidal, parallelogram-shaped, or rhombic or diamond-shaped outline or cross section.

The recesses can also have a triangular or semi-circular outline or cross section. Furthermore, the tread configuration of the present invention can include a combination of the aforementioned shapes or outlines for the recesses.

Referring now to the drawings in detail, to facilitate understanding of the improvements according to the present invention, a description is first provided for the embodiment according to FIGS. 1 and 2 as included in the aforementioned U.S. patent application Ser. No. 419,413, Seitz et al.

The center of the tread is represented by a line 1, which at the same time represents the circumferential direction of the tire.

A line 2 extending in the axial direction serves to subdivide the outer peripheral surface of the tire into several segments, and in FIGS. 1 and 2 into two equally long segments 3,4, i.e., into two halves.

The tread profile in the first segment 3 essentially comprises transverse pieces or ribs 5 which extend uninterruptedly and continuously from one tread edge to the other tread edge; the transverse ribs 5 are connected by short circumferential ribs 6 which extend in the circumferential direction, and in particular in such a manner that the ribs 6 are offset or displaced relative to one another when viewing successive pairs of transverse ribs 5.

The ribs 5,6 essentially delimit transversely extending rectangular depressions or recesses 7 which have a width $a_1$. Due to the ribs 5,6, the depressions 7 form cell-like enclosures when the associated portion of the tread fully engages the roadway. The width $b_1$ of the transverse ribs 5 is slightly greater than half the circumferential dimension (i.e. $a_1$) of the recesses 7, or in other words approximately half of the distance between successive transverse ribs 5. This dimension can also apply to the circumferential ribs 6, which however are spaced from one another in the transverse direction by a distance approximately equal to four times their width.

The tread configuration in the second segment 4 of the tread is similar to that in the first segment 3. In this connection, the term "similar" is to be understood in a geometric sense, at least with respect to the widths of the transverse ribs 5,5' and of the recesses 7,7'; thus $a_1:a_2 = b_1:b_2$, where the width of a recess or depression 7' is designated with $a_2$, and the width of a transverse rib 5' in the second segment 4 of the tread is designated with $b_2$. In the present example, the ratio $a_1:a_2$ has a value of 4/5.

Within each segment 3,4, the respective recesses 7,7', transverse ribs 5,5', and circumferential ribs 6,6' have the same dimensions, while the profile depth of both of the segments 3,4 is the same, namely approximately 4 mm.

In addition to the situation described in the sample embodiment, the peripheral surface can also be subdivided into more than two segments, and where there are two segments, it can also be advantageous to have different lengths for the two segments. In each situation, each of the segments should preferably have a length of 25 to 75% of the entire circumferential length.

When selecting two or four segments, and recesses 7,7' and transverse ribs 5,5' with two different widths $a_1$, $a_2$ and $b_1$, $b_2$, the width ratios $a_1:a_2$ and $b_1:b_2$ should be between 6:10 and 9:10.

It is, however, also possible to subdivide the peripheral surface of the tier into, for instance, three segments with different widths for the recesses and the ribs from segment to segment; however, also in this situation, the different recesses or depressions and transverse ribs should be geometrically similar.

It should be noted that the inventive tread configuration, due to the small profile depth, can be used in an outstanding manner not only for radial tires, but also for bias ply tires.

The inventive embodiment according to FIG. 3 differs from the embodiment of FIG. 1 in that the recesses 7,7' of rectangular outline or cross section are replaced by recesses 8,8' of trapezoidal outline or cross section. This necessarily results in a replacement of the circumferential ribs 6,6' with angled or inclined ribs 9,9'. All remaining dimensions and observations from the previous embodiment are also applicable to the example according to FIG. 3, so that in particular the circumferential dimensions $a_1$, $a_2$ of the rectangles and of the trapezoids (height), and the circumferential dimensions $b_1$, $b_2$ of the transverse ribs 5,5' in both circumferential segments 3,4 are identical to both examples.

According to FIG. 3, the trapezoidal recesses between two successive transverse ribs are located in a transverse row in such a manner that the extension of the lower base line of one trapezoid coincides with the upper base line of the adjacent trapezoid, and vice versa. The base lines of trapezoids of adjacent transverse rows can be offset or displaced with respect to each other. The trapezoids at the ends of the rows can have legs which extend at a right angle to the base line.

Figure 4:
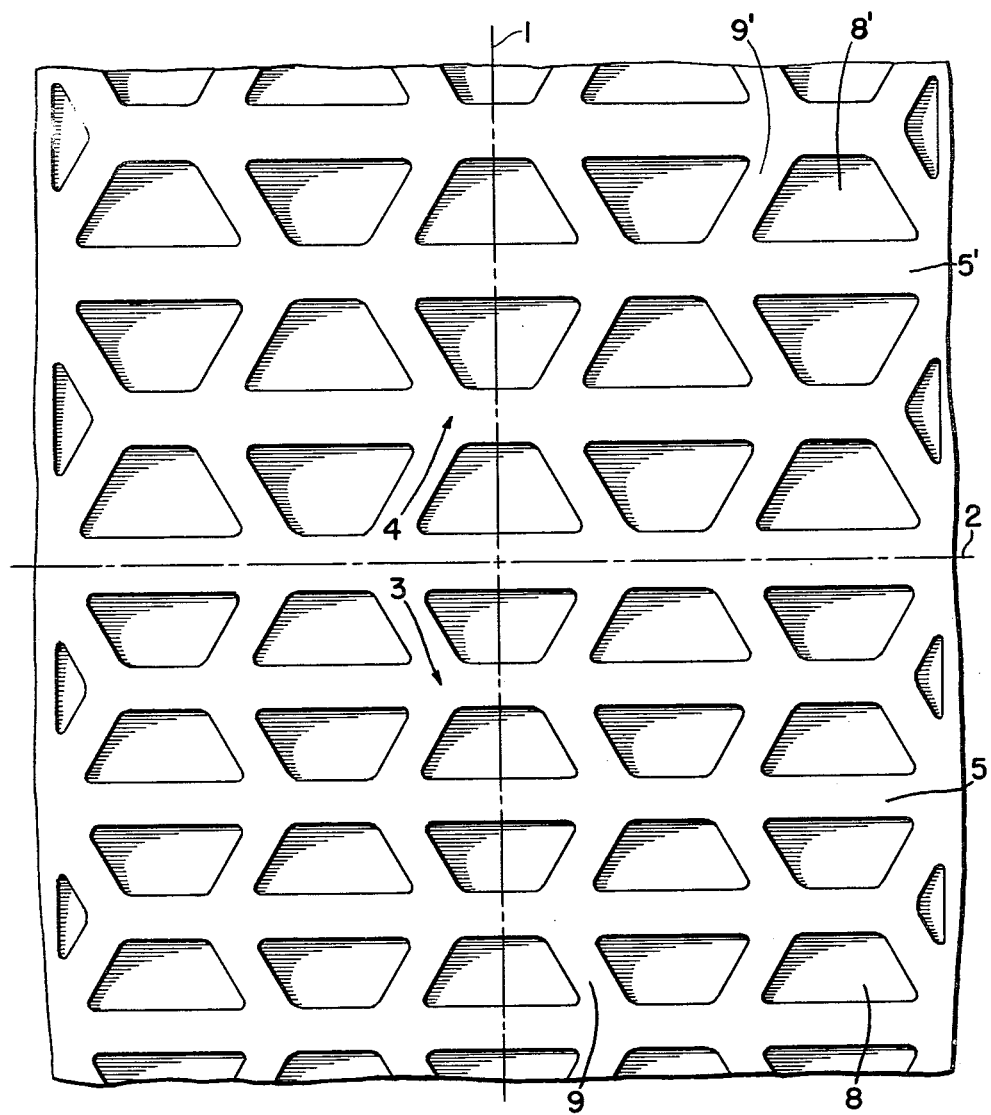
FIG. 4 is a partial plan view of an outer peripheral surface of another embodiment of the inventive tread configuration for a spare tire, also with trapezoidal-shaped recesses.

Trapezoidal recesses 8,8' are also provided in the embodiment of FIG. 4. The trapezoids however are arranged mirror-inverted to each other in two adjacent transverse rows, whereby the center line of the transverse rib 5 located therebetween forms the axis of symmetry.

The base lines and legs of trapezoids of recesses 8,8' adjacent to each other can also have different lengths, so that the angle of inclination of the inclined ribs 9,9' can also be different.

Figure 5:
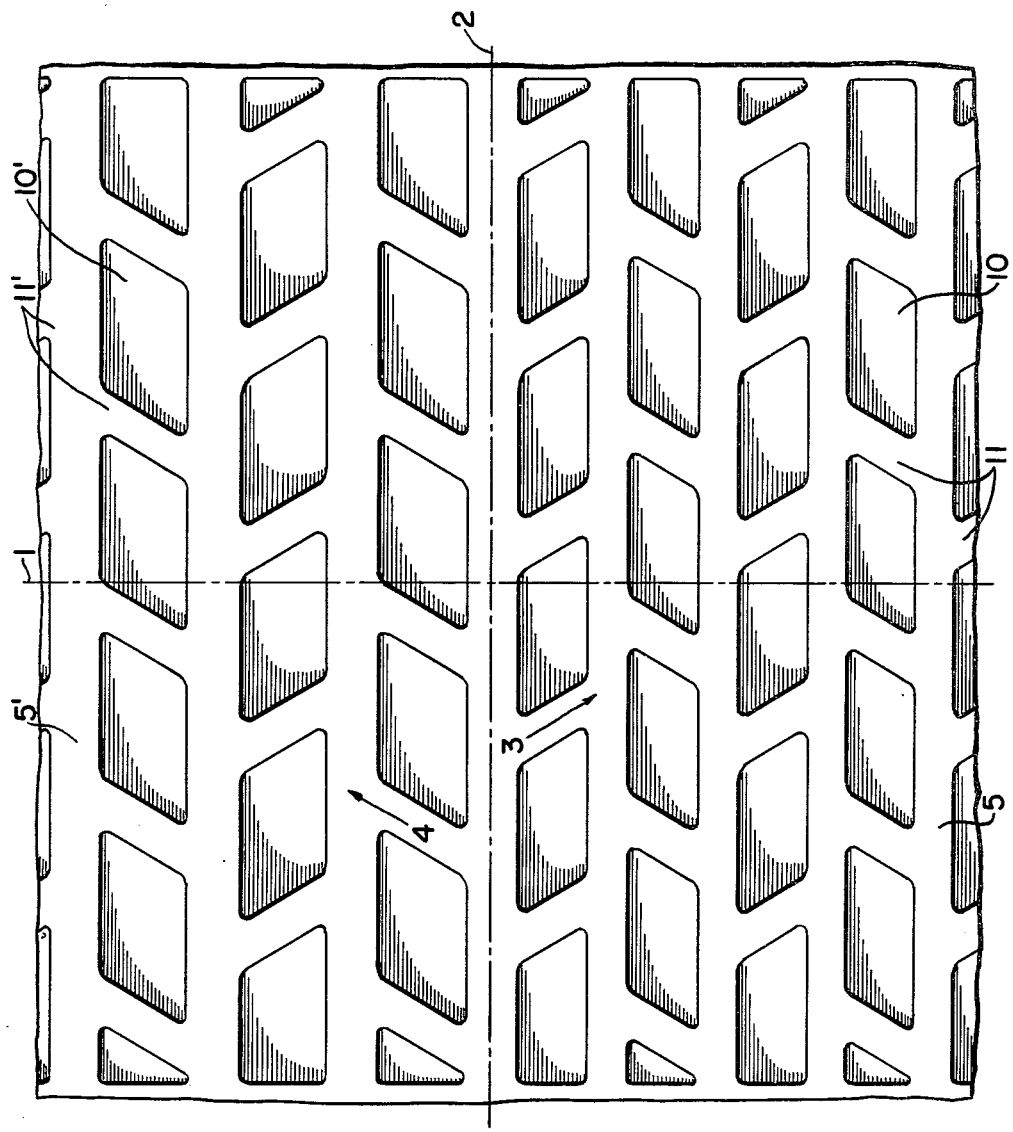
FIG. 5 is a fragmentary plan view of an outer peripheral surface of yet another embodiment of the inventive tread configuration for a spare tire, with parellelogram-shaped recesses.

FIG. 5 describes an example according to which the rectangular recesses 7,7' of FIG. 1 are replaced by recesses 10, 10' having a parallelogram-like outline. In this connection, a diamond or rhombic-shaped outline is, of course, also possible. The legs of adjacent recesses 10 or 10', and hence the ribs 11, 11' which delimit them, alternate in their direction of inclination when viewed in the circumferential direction. It is, however, also conceivable to provide an embodiment where the legs have the same inclination.

According to a further specific embodiment, the rectangular recesses 7, 7' of FIG. 1 are replaced by recesses having a triangular outline, so that except for the necessary replacement of the circumferential ribs 6,6' by slanted or inclined ribs, all observations are also applicable here.

Finally, according to yet another embodiment, it is also possible to replace the rectangular recesses by semicircular recesses, and in particular in such a manner that the straight line of a semicircle is formed by the edge of a transverse rib.

Combinations of the described sample embodiments are also possible.

The present invention is, of course, in no way restricted to the specific disclosure of the specification and drawings, but also encompasses any modifications within the scope of the appended claims.

What is claimed is:

1. A tread configuration for the radially outwardly located peripheral surface of a pneumatic vehicle tire used as a spare tire to replace a regular tire that went flat, for example, said tread configuration comprising in combination:

transverse ribs respectively extending transverse to the circumferential direction of said tire; and circumferential ribs at least some of which respectively extend at an angle to the circumferential direction of said tire, said circumferential ribs interconnecting said transverse ribs in such a way as to define a plurality of separate recesses therewith, with at least one boundary line of each of said recesses being formed by an edge of one of said transverse ribs; with the narrower dimension of each of said transverse and circumferential ribs being approximately $\frac{1}{4}$ to $\frac{3}{4}$ of the circumferential dimension of an adjacent recess; the number of said transverse and circumferential ribs being such that, when viewed in the circumferential direction of said tire, several recesses are disposed next to one another, and a plurality of recesses are disposed one after the other; said peripheral surface of said tire being divided into at least two segments; within a given segment, the circumferential dimension of said recesses is constant, and the circumferential dimension of said transverse ribs is constant, while the circumferential dimension of said recesses, and the circumferential dimension of said transverse ribs, of a given segment differ from those of a successive segment to obtain a high noise delivery, and especially to obtain a number of tones which very penetratingly affect the ears of the driver, such that said transverse ribs which are separated from each other by adjacent recesses are indispensible in the tread configuration in a need to cooperate and interact with each other accordingly.

2. A tread configuration in combination according to claim 1, in which two boundary lines of a given recess are formed by edges of said transverse ribs.

3. A tread configuration in combination according to claim 2, in which said recesses have a trapezoidal shape.

4. A tread configuration in combination according to claim 2, in which said recesses have a parallelogram shape.

5. A tread configuration in combination according to claim 2, in which said recesses have a rhombic shape.

6. A tread configuration in combination according to claim 1, in which said recesses have a triangular shape.

7. A tread configuration in combination according to claim 1, in which said recesses have a semicircular shape.

8. A tread configuration in combination according to claim 1, in which said recesses have different shapes.

* * * * *